INVENTOR.
ANSELM FRANZ.

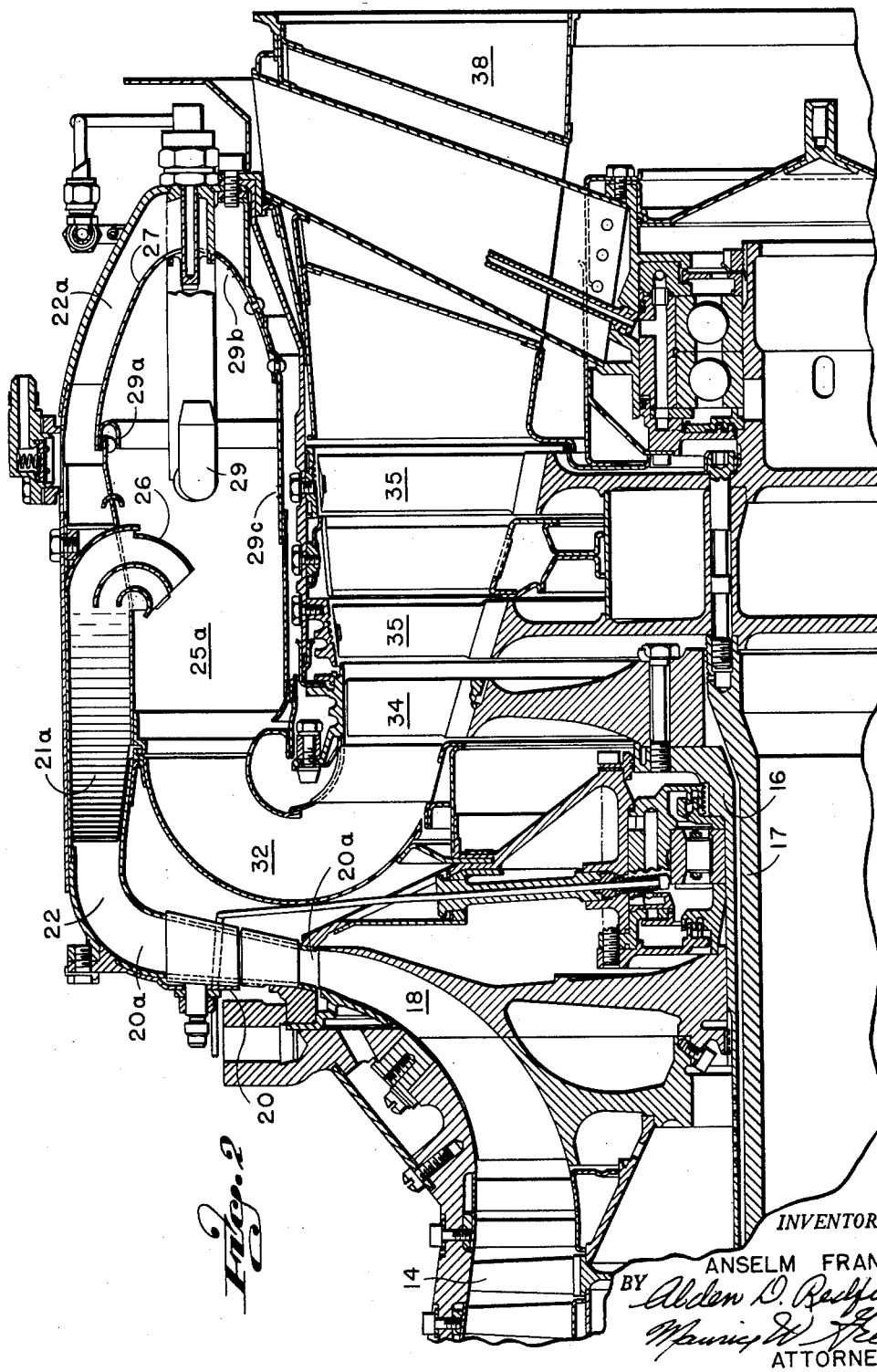

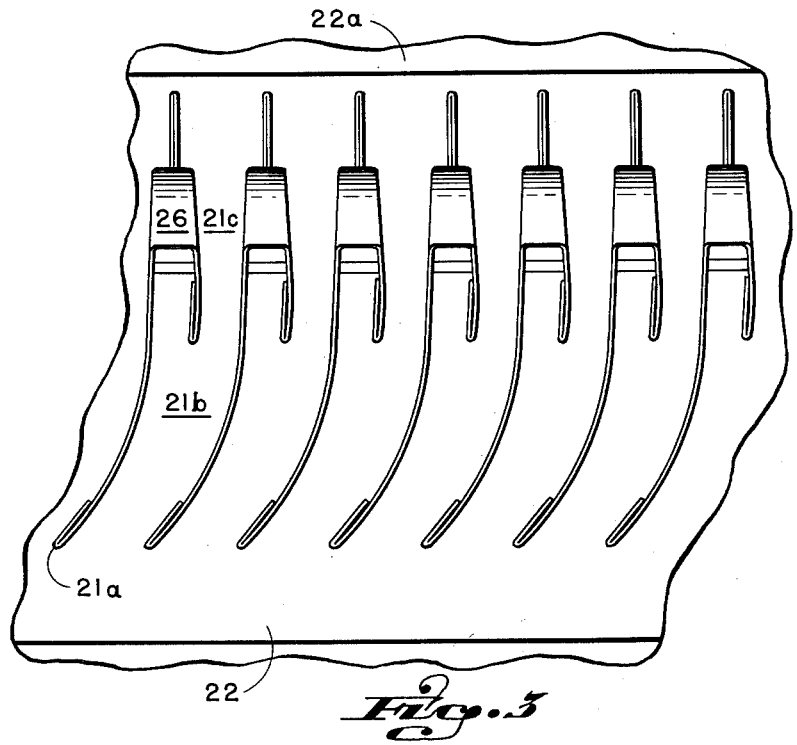

United States Patent Office

3,019,606
Patented Feb. 6, 1962

3,019,606
COMBUSTION SECTION FOR A GAS TURBINE ENGINE
Anselm Franz, Stratford, Conn., assignor to Avco Corporation, Stratford, Conn., a corporation of Delaware
Filed Sept. 4, 1959, Ser. No. 838,346
3 Claims. (Cl. 60—39.65)

The present invention relates to an improvement for gas turbine engines, and more specifically to an improved air-fuel mixing and combustion section for such an engine.

The present invention is intended for use in that broad classification of engines having a compressor, a combustion section supplied with air from the compressor, and a turbine which is driven by the hot combustion products received from the combustion section.

The means for division of air flow from the compressor into portions for dilution on the one side and for combustion and cooling on the other side constitutes the primary feature of the invention.

As illustrated in this application, the engine includes a combined axial-centrifugal flow compressor, and turbine wheels driven by the combustion products. The first turbine wheel is directly coupled in driving relationship with the compressor. Further downstream the second and third turbine wheels drive an output shaft which may deliver power through a reduction gear to an aircraft propeller. The power output shaft may also be used for driving a helicopter rotor or for driving any other power-consuming device.

In general terms, the combustion section of the present invention is characterized by a plurality of concentric sheet metal walls defining annular spaces through which the air from the compressor is conducted, whereby a homogeneous mixture of combustion products and cooling air is delivered to the turbine section at an acceptable operating temperature.

In the particular engine illustrated, the combustion section of the engine receives air from the compressor through an annular diffuser which gradually converts a part of the velocity component of the airstream energy to static pressure.

The combustion section of the engine comprises a combustion chamber concentrically located about the turbine rotors. In the course of passing through the combustion section, the gases undergo two 180° reversals of direction. Such flow reversals make it possible to provide an efficient combustion chamber within a minimum of engine length. Its concentric arrangement about the turbine section favors a minimum shaft length and maximum utilization of the available volume within the engine envelope, with geometrical proportions which favor performance at high levels of efficiency.

The combustion chamber is annular in form and is surrounded by a moving layer of cooling air. The inner walls of the combustion chamber itself are insulated from the combustion products by layers of air.

Of the air received from the diffuser, approximately one-half is used for supporting combustion and cooling the combustion chamber walls. The other half of the air is introduced through scoops into the combustion chamber to reduce gas temperatures to levels practical for use in the turbine section. This portion of the air is termed "dilution air." The scoops with their curved guide vanes constitute an important aspect of the present invention and are especially designed to introduce dilution air with a minimum of pressure loss and to provide for by-passing other air for further diffusion and cooling and to be introduced into the primary zone to support combustion. The scoops are positioned circumferentially in spaced relationship to intercept a portion of the airstream from the diffuser throughout its entire radial extent and are positioned at the outlet of curved channels used to insure an axial flow of the air leaving the diffuser.

More specifically, the principal object of the invention is to provide a combustion section for a gas turbine engine wherein air for mixing with fuel and air for cooling and dilution is effectively and efficiently fed to the combustor, and the division of dilution and combustion air is accomplished uniformly and effectively for maintaining satisfactory combustion temperatures and conditions.

The novel features that are considered characteristic of the invention are set forth in the appended claims. The invention itself, however, both as to its organization and method of operation, together with additional objects and advantages thereof, will best be understood from the following description of a specific embodiment when read in conjunction with the accompanying drawings, in which:

FIGURE 2 is a longitudinal cross-section of the engine in the regions of the compressor, combustor and turbines.

FIGURE 3 is a plan view of a plurality of the scoops arranged around the circumference of the engine, and is a developed view with the outside wall removed, and shows the spaced positioning of the scoops in the curved channels formed by the approach guide vanes.

Figure 1:
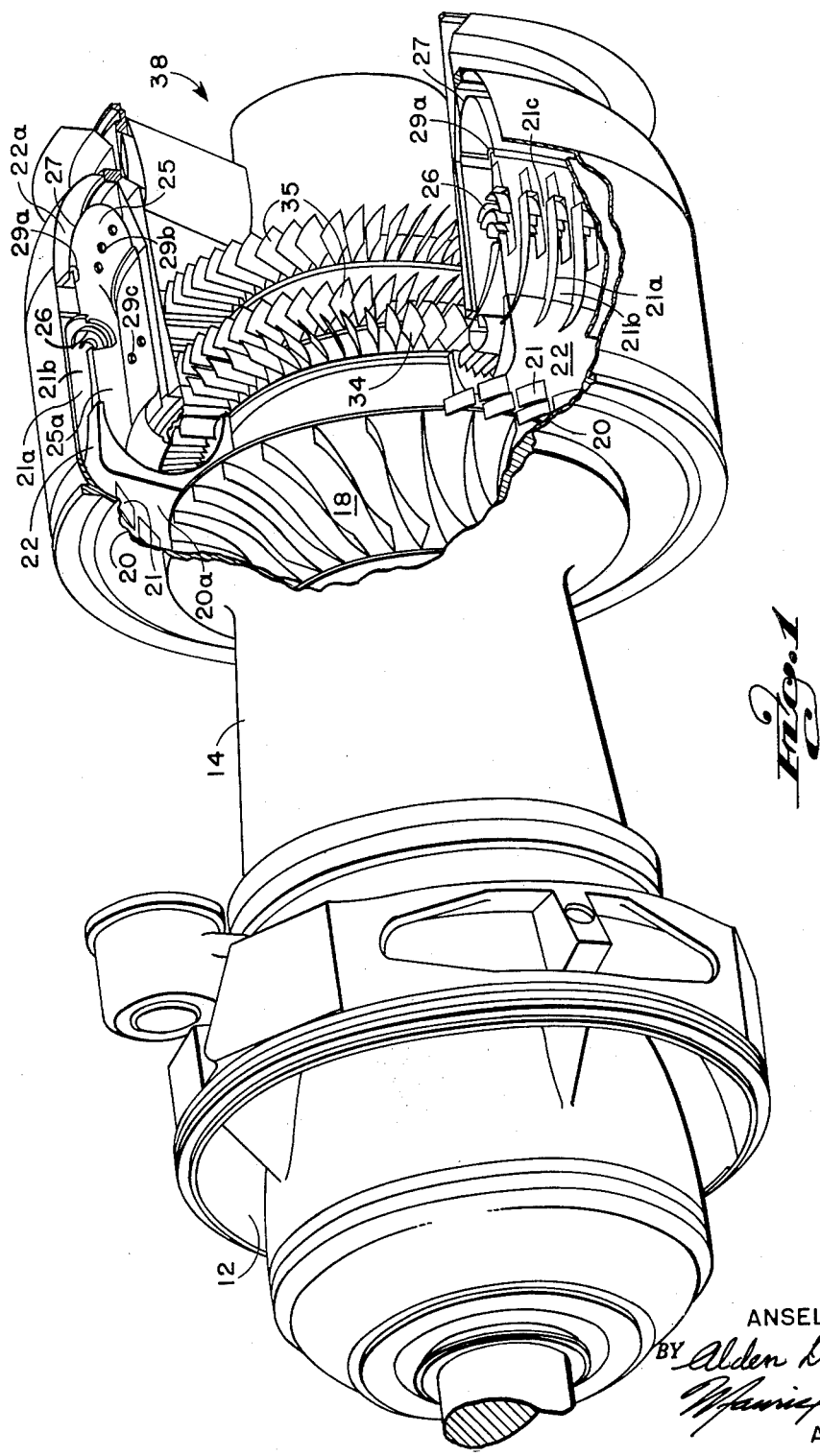
FIGURE 1 is a perspective view, partly in section, of the assembled gas turbine engine.

Referring to the drawings, and particularly to the perspective cutaway view of FIGURE 1, the housing which is in the forward portion of the engine provides for an air inlet 12, from which inlet air is fed into a multi-stage compressor. This compressor is comprised of several axial forward stages 14 and radial exit stage 18 both driven by a turbine 34.

Referring to FIGURE 2, in addition to FIGURE 1, it appears that a hollow compressor driving shaft 16 from turbine 34 has a power shaft 17 coaxial and inside the compressor shaft which is independently driven by power turbine 35, the engine illustrated being of the so-called free-power turbine type.

Air discharge from the last stage 18 of the compressor is of relatively high velocity and (as shown in FIGURES 1 and 2) discharges outwardly into an annular diffuser housing 20 which defines a radially extending diffuser flow passage 20a. This passage provides a gradually increasing flow area for partially converting the kinetic energy into static pressure. Because of the rotation of the centrifugal compressor rotor, this air has a definite circumferential component of velocity even at the leaving end of flow passage 20a as viewed in FIGURES 1 and 2. It is, however, desirable and necessary to bring the flow direction to as near an axial direction as is possible, thus to provide for the most efficient and effective distribution and use for combustion and dilution.

The diffuser is provided with vanes 21 to aid and support the diffusion process of reducing velocity, and these vanes are inclined to follow in part the rotational air movement as shown. The passage 20a flows into an outer casing passage which is an annular air chamber 22 extending toward the exhaust axially. A circumferential portion of this annular air chamber 22 is shown in FIGURES 1 and 3, and it is there shown that curved vanes 21a are circumferentially spaced to form curved channels 21b in the annular air chamber 22. The flow of air with its original rotational component is guided into these curved channels 21b (see FIGURES 1 and 3), which are formed in such a way that the air leaves the channels 21b toward scoops 26 in a direction substantially parallel to the longitudinal axis of the engine. Each scoop 26 is positioned to divert air through wall 27 into the dilution region 25a of combustion space 25 and bridges only a portion of the width of its channel 21b and is located to be in alignment with air flowing on the inside of the curve of the channel while the remainder of each channel width forms a by-pass and diffusion channel 21c, which is in alignment with air flowing on the outside of the curve in each channel 21b.

The vanes 21a extend to form one wall of each scoop 26 and each vane 21a is extended to form the other side of its scoop 26. Adjacent guide vane-scoop assemblies form curved channels 21b and diffusing by-pass channels 21c. This specific structure used in practice is illustrative.

The portion of the airstream on the inside of the curved channel 21b in line with scoops 26 is of lower energy, while that portion aligned with the by-pass channels 21c is the flow on the outside of the curved channel and is of higher energy. This higher energy portion of the airstream, which by-passes the scoop, flows into chamber 22a, and by its flow through the curved channels 21b has now been straightened to a substantially axial direction of flow, and the lower energy portion of this air has been literally scooped out for use as dilution air.

The portion of the airstream not covered by the scoops thus flows on into chamber 22a (see FIGURES 1, 2 and 3). The annular air chamber 22a surrounds the combustion space and primary mixing and burning zone of combustion space 25 and supplies air for this primary combustion region through openings 29a, 29b, 29c, in a common wall 27 between air chamber 22a and combustion space 25. The annular form of the diffuser 20, air channels 22, 22a, and combustion space 25, appear on reference to FIGURES 1 and 2. The annular passage forming air channel 22a is designed in the region aft of the scoops, so that the air is provided with a diffusion passage 22a accomplishing further diffusion of the air in its passage toward the combustion space to slow up the flow and convert a major portion of its remaining velocity head into static pressure so that there will be a maximum of available static pressure to cause the air to flow through the openings 29a, 29b, 29c, in the common wall 27 into the primary combustion space 25.

Referring to the cross-section of FIGURES 1 and 2, openings 29a, 29b and 29c are shown so arranged that flow through common wall 27 is in a direction such that outlet into the combustion space is in the direction of gas flow in that space—that is, reversed in direction from flow in air channel 22a. Fuel is fed into the primary zone or so-called combustion space 25 through fuel injection units 29, a series of which are spaced around the annular space 25, for mixing and burning. Ignition is accomplished by igniters during the starting cycle. The combustion products from the primary zone are directed toward the left in the combustion space 25 (see FIGURE 2) and at the position opposite the dilution air scoops 26 the dilution air is directed into the combustion products as previously stated. These scoops 26 are formed to reverse the direction of flow on passage through the common wall 27 so that the dilution air is directed into the combustion products in the dilution region 25a in the same direction in which the combustion products are moving, namely, toward the left in the region 25, 25a. It will be remembered that before the dilution air is fed into the combustion space through scoops 26 that the air is turned to a general axial direction by the curved vanes 21a. This further reversal of flow by the scoops 26 on passage through the common wall 27 results in a movement of air axially in the dilution region 25a in the same direction of flow as the combustion products of air-hot gas mixture to effect a mixing resulting in a desired temperature distribution in the mixture of combustion products entering the turbines without sacrificing more than a bare minimum of pressure loss. The hot gases, thus diluted and mixed, after making a 180° turn are guided into the compressor driving turbine 34 and subsequently through the power turbine 35 and out the exhaust 38 at the rear of the engine.

The above-described combustor unit of annular form surrounds the turbines, and is of generally reverse-flow so-called folded arrangement, there being two 180° reversals of flow. The first 180° reversal is accomplished by reversing air flow from air channel 22a into combustion space 25 by both dilution air scoops 26 and a plurality of reversing air openings 29a, 29b, 29c in the common wall between air channel 22a and combustion space 25. The second 180° reversal into the turbine region is effected by the form of channel 32 as mentioned.

Briefly summarized, the structure which has been described makes the most efficient use of the flow condition existing behind curved diffuser vanes for providing highest possible energy or turbulence level in the primary combustion zone. To accomplish this purpose in an efficient manner, there is set up the series of curved channels 21b positioned side-by-side around the entire periphery of the annular chamber 22. At the outlet of a curved channel there will be a marked difference in airflow energy following the inside of the curve as compared with the outside, the inside region being of lower energy and the outside of the curve being of higher energy.

Therefore, it is a proper decision, inasmuch as it is desired to remove a portion of the air at this point, through scoops 26, to take the lower energy air for dilution and to use the higher energy to establish axial flow and maximum possible static pressure in the annulus surrounding the combustion region, these conditions being most desirable for efficient and stable combustion.

The invention has been described by reference to the structure of a specific engine found practical in actual operation, but it is intended that various modifications may be made without departing from the fundamental principles herein disclosed and within the scope of the following claims.

I claim:

1. In a gas turbine engine, a combustion section having a primary combustion zone and a dilution region, a compressor, a diffuser section for said compressor, an annular air chamber receiving air from said diffuser and surrounding said combustion section, a wall between said air chamber and said dilution region, a series of curved deflector vanes positioned and circumferentially spaced in said air chamber adjacent said wall to form channels in said air chamber for effecting a turn and changing direction of the flow of air from a partially circumferential direction to an axial direction and resulting in increasing gradients of energy in the air flow from a lower energy region on the inside of the turn in each of said channels to a higher energy region on the outside of said turn, and a series of air scoops in said wall each with an inlet in said chamber and an outlet in said dilution region, one of said scoops being positioned in each of said channels with said inlet bridging a portion of each channel in the region of lower energy air thereby to divert a portion of the air through said scoops from each channel into said dilution region and leaving a passage adjacent each of said scoops for continuing the axial flow of higher energy air in said air chamber.

2. In a gas turbine engine, a combustion section having a primary combustion zone and a dilution region, a compressor, a diffuser section for said compressor, an annular air chamber receiving air from said diffuser and surrounding said combustion section, a wall between said air chamber and said dilution region, air scoops in said wall, each of said scoops having an inlet in the air chamber and an outlet in the dilution region for diluting products of combustion with air in said dilution region for the cooling thereof, a plurality of vanes in said chamber adjacent said wall forming curved channels causing a turn in the direction of flow of said air in its flow from one portion of said air chamber to another, thereby providing a gradient of air flow in each of said curved channels between said vanes from lower energy air on the inside of the curve to a higher energy air on the outside of the curve, and structure positioning said scoops in said curved channels with inlets over a portion of the width of said channels to scoop air therefrom into said dilution region from the region of lower energy air in said channels and leaving a portion of each said channel open for flow of air of higher energy past said scoops for subsequent use in said combustion section for burning.

3. In a combustion section for a gas turbine engine having a circumferential housing enclosing an annular combustion space and a dilution region surrounded by an annular air chamber with a common wall therebetween the combination of, means to supply air flow under pressure to said chamber, curved guide vanes in said air chamber circumferentially spaced and forming channels to turn the direction of flow of air in said annular air chamber into an axial direction relative to the engine thus setting up an air energy gradient of lower energy air adjacent the inside of the curve in each channel, scoops positioned in said common wall with inlets, one in each said channel, in the region of axial flow direction and bridging a portion of each channel in position to receive air from the inside of the turn of each said channel and to scoop air from the lower energy region of each channel through said scoops to scoop air into said dilution region and to reverse said flow to an opposite axial flow direction thereby to supply dilution air into said dilution region in the same direction as the flow of gasses in said dilution region.

References Cited in the file of this patent

FOREIGN PATENTS 666,416   Great Britain _____ Feb. 13, 1952